Feb. 28, 1939.  F. E. MAIER  2,148,950

CAR BODY FOR AUTOMOBILES

Filed Oct. 17, 1936  2 Sheets-Sheet 1

Inventor:
Friedrich E. Maier
By Sommers + Young
Attys

Feb. 28, 1939.  F. E. MAIER  2,148,950
CAR BODY FOR AUTOMOBILES
Filed Oct. 17, 1936  2 Sheets-Sheet 2
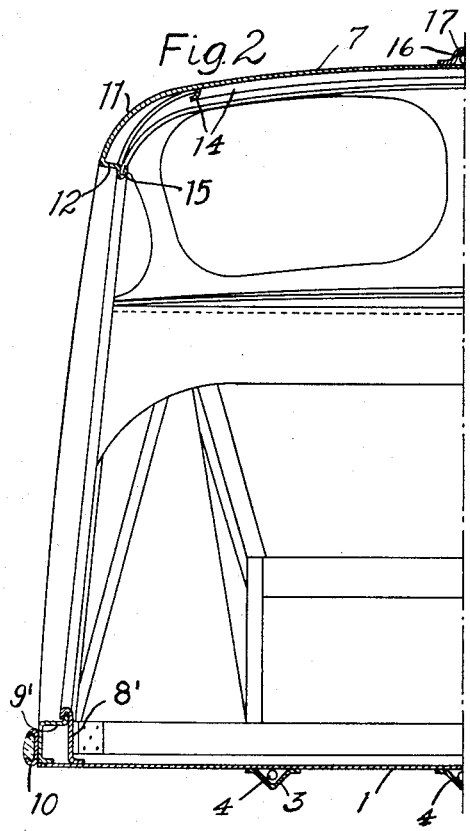
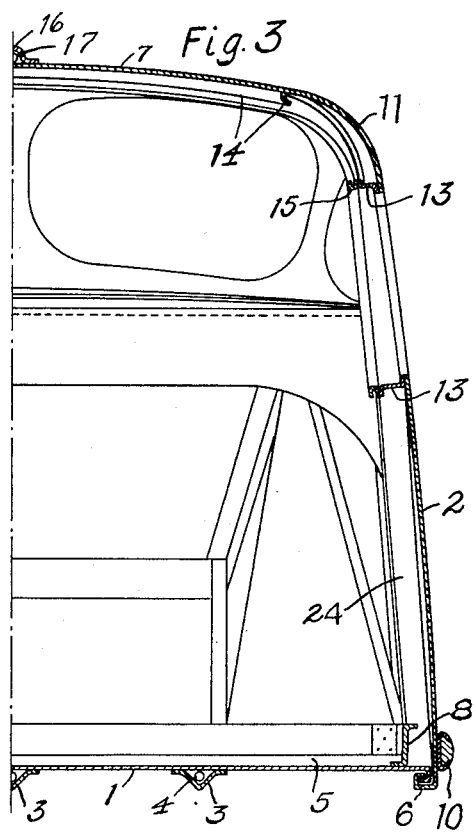
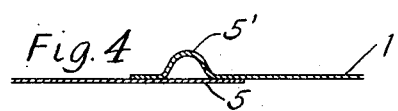
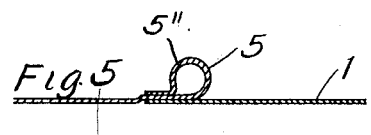
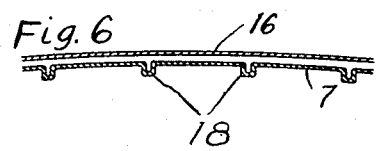
Inventor:
Friedrich E. Maier
By Sommer & Young
Attys Patented Feb. 28, 1939

2,148,950

UNITED STATES PATENT OFFICE 2,148,950

CAR BODY FOR AUTOMOBILES

Friedrich Eugen Maier, Berlin-Charlottenburg, Germany

Application October 17, 1936, Serial No. 106,214
In Germany October 22, 1935

2 Claims. (Cl. 296—28)

The present invention relates to bodies for automobiles and more particularly to closed bodies of the type that are self-supporting and resistive to twist and, while fully attaining these properties, also attains a weight reduction not attained in any type of vehicle body so far known. The various attempts and suggestions made in this connection have failed as yet to yield a satisfactory solution. Suggestions theoretically correct for self-supporting car bodies which are twist resisting have, for example, provided for a latticework which is self-supporting in itself but which is additionally braced. In this case the disposition, size and customary design of the windows and doors and other required openings (such as the opening provided for installing the engine) were interfered with and even obstructed.

The present invention is characterized in that both sides of the supporting outer walls of the vehicle body, that is the lateral walls, the floor and the roof, are provided with reinforcing or stiffening members, which reinforcing members are so dimensioned and arranged as to cross each other; the said supporting walls abutting against each other at the edges and corners in such manner that the supporting walls are mutually reinforced and made rigid. The supporting walls, which themselves are thin, are thereby made capable of forming a rigid, torsion-resisting, spatial union, the form of which is of a streamline character, and are constructed according to the space requirements. These walls are thus supplemented in their load-carrying capacity by additional reinforcements so as to be able to carry all the local and general strains. Reinforcing members are provided on the outer side of the supporting walls which cross the front edges of intermediate walls provided interiorly on the supporting walls.

Another feature of the invention consists in that the reinforcing members on the exterior of the outer walls extend as nearly parallel as possible with the direction of travel of the vehicle, while the inwardly extending reinforcing members are directed transversely thereto. The latter can be formed suitably of the margins of the abutting plates of the supporting walls.

In the accompanying drawings which illustrate an embodiment of the invention, Fig. 1 is a vertical longitudinal section in perspective of a car body according to the present invention;

Fig. 2 is half of a section on line II—II of Fig. 1;

Fig. 3 is a half section on line III—III of Fig. 1; and

Figs. 4, 5 and 6 are cross-sectional views showing details of stiffening members formed from the outer walls of the body.

Figure 1:
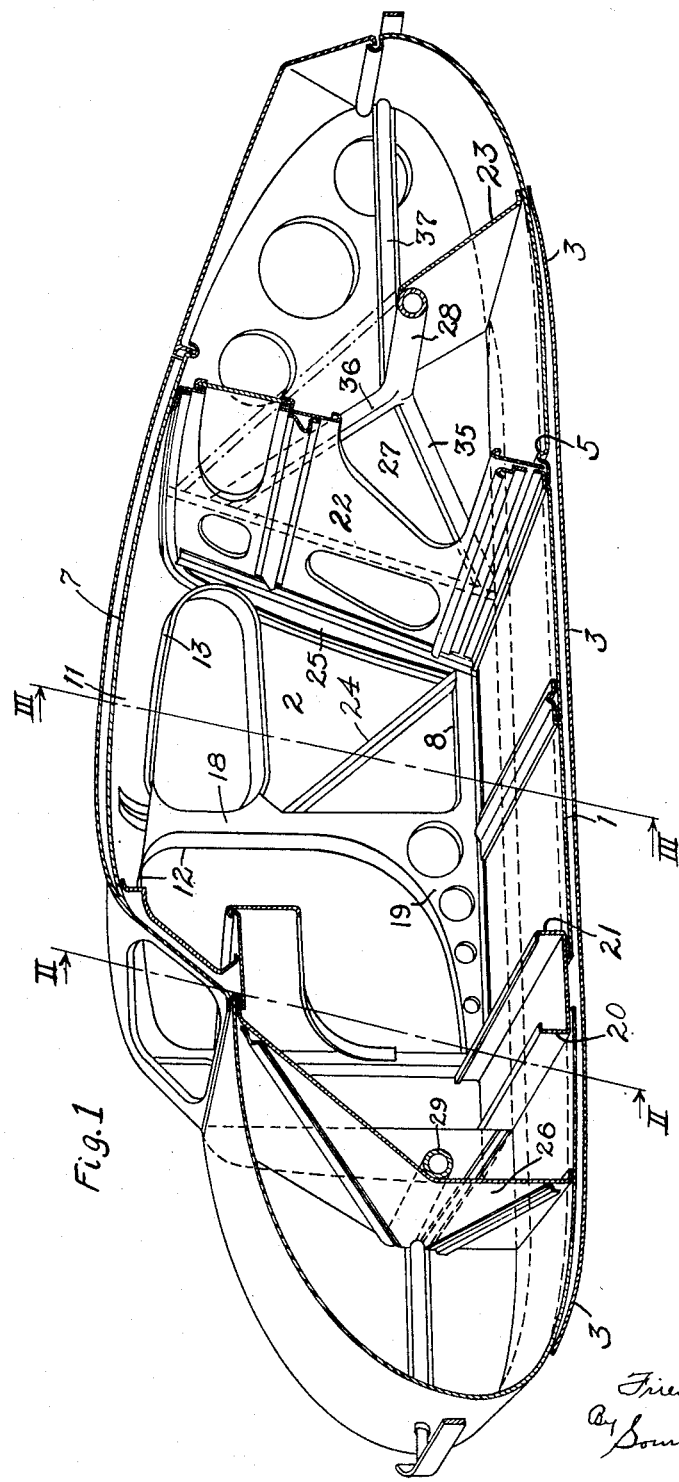

The sectional areas in Fig. 1 clearly show that the car body is constructed of sheet metal walls. The floor 1 is designed as a shear resisting wall which is carried by the side walls 2 and locally stiffened by longitudinal profiles 3, which may house rods 4 for control of the brakes or other mechanism. The floor plate 1 is divided transversely to the direction of running, as at 5, one of the two edges being bent into a profile as shown in Figs. 4 and 5 on a larger scale. This profile may have various shapes according to local requirements, for instance as indicated by 5' or 5", Figs. 4 and 5, in order that a row of rivets can be omitted. The shape of such profiles preferably depends on the local conditions, particularly with a view to fulfilling other useful purposes. The corner connection between the floor 1 and the side wall 2 is obtained by flanging one or both edges of the sheet metal (Fig. 2), or by crimping the edges together (Fig. 3) and finishing by spot welding or riveting.

The side walls 2 in combination with the roof 7 are designed as girders subject to flexure. The metal required for the bottom chord comprises the crimped corner connection 6 between the side wall 2 and the floor 1, and a section 8, Fig. 3; and section 8' and member 9', Fig. 2, as well as longitudinally extending protecting strake or rail 10 in both of these figures. The corner connection combined with the "cooperating width", that is, the width determined in statics by theory and experiment of adjacent walls—in sheet metal or ply wood—taken into account as a part of the chord, of the floor will suffice in many instances so that further reinforcing means can be dispensed with. The top chord of the girder formation is represented by the corner connection 11 which is resistive to compression, the top portions of the stiff top frame members 12 and 13 of the door and window openings and the profiles 14 and 15 which latter may also be used for fastening the interior covering (not shown). The profile 14 is obtained in the same way as the floor profiles 5 by flanging and shaping the edge of a sheet at the junction of two sheets.

In the embodiment shown, the vertical forces acting in the side walls within the door zone are taken up chiefly by a girder 19 of approximately triangular shape which is locally effective and located substantially beneath the door, while a smaller part of the said forces is transmitted by the top chord of the girder 11 adapted to take up bending stress. Larger freedom as to designing the door opening is afforded by the top edge of the side wall or the whole roof being constructed over its full length as a girder subject to flexure.

As for the rest, the side walls 2 are a typical example of diverse and consistent application of the fundamental idea of the invention. In the right-hand top portion of the said wall, Fig. 1, the stiff frame 13 of the window opening serves to transmit forces. In the left-hand top portion of the wall the stiff frame 12 of the door opening is in part combined with the door pillar, and with the aid of the sheet 18 is gradually converted into a hollow profile which below and at the left forms the triangular flexure-resisting girder 19 of variable depth. In the lower righthand portion, diagonal member 24 resolves the wall surface into two triangular systems, for example, 8, 19 and 24 on the one hand and 13, 24 together with the connecting angle member 25 of the rear wall 22 of the passenger compartment, on the other hand.

The roof 7 is constructed as a wall resistive to shear, and stiffened in the longitudinal direction by the hollow section 16, the interior space of which may be used for housing cables or Bowden wires 17 (Figs. 2 and 3). If required, the outside shell serving as the roof may be stiffened by beads 18 (Fig. 6) disposed transversely to the direction of running and which preferably project inwardly and cross the longitudinal profiles, for example 16, which are disposed on the outside.

The vertical supporting walls 27 which are displaced from the plane of the outer side wall towards the interior of the body by a distance corresponding to the width of the wheel covers are adapted to support the rear axle 28. The said supporting walls are provided with sections 35, 36, 37 which are adapted to transmit the forces from the axle 28 to the upper and lower chords of the side walls, roof and floor of the passenger compartment.

The front portion of the car body is a box-like structure. Numeral 29 designates a front axle tube which is braced by transverse wall 26.

When the outside shell is to be reinforced by sections or the like attached thereto, this may be done with a view to the bars or other stiffeners fastened outside the car outline being parallel to the direction of running (in accordance with the air flow), for example the sections 3, 10 and 16. On the other hand, the bars provided within the outside shell or directly worked from the same are preferably disposed more or less transversely to the direction of running, as may be required, for example the sections 5 and 25. Thus the inside and outside bars will cross one another and in the various instances result in local reinforcements complying with the particular requirements. Crossings of this description may also be systematically used for uniformly stiffening large flat walls, such as in omnibuses, or lorries for light but bulky goods (for laundries, cardboard factories, etc.).

Other examples of the reinforcement of the supporting outer walls of the vehicle body are shown on Fig. 1. Thus, the transverse wall 26 forms at its lower edge an intersection with the longitudinal members 3, also the transverse members 20 and 21 as well as the transverse walls 22 and 23. The transverse wall 22 crosses at its upper edge also the longitudinal members 14 and 16 of the roof surface 7. Also, the vertical parts of the reinforcing frame straps 12 and 13 form with the member 24 and the vertical edges of the wall 22 triangular connections for reinforcing the lateral walls 2.

The exemplary embodiments illustrated show that the entire outer sheath necessary for the formation of the vehicle body serves, through the arrangement of the additional reinforcements according to the invention, to make the vehicle body self-supporting and sufficiently resistant to local strains.

The fact that almost every structural member of the car body is integrally comprised in the system intended for taking up and transmitting forces warrants that a car body so designed and constructed will result in an optimum as to material spent and strength afforded. As is evident, the system is in the embodiment represented even statically overdetermined. According to the particular purpose, one or more members may be omitted without the absolute resistance to flexure and twist of the car body being adversely affected. In all events, the fact that the structure is statically overdetermined is of paramount importance in the event of accidents, since even if several members are destroyed, the stiff supporting system will be preserved.

What I claim as my invention, and desire to secure by Letters Patent, is—

1. A self-supporting, frameless body for motor vehicles comprising outer wall panels constituting the floor, side walls, and roof, said panels having on both sides thereof reinforcing profiled members having substantial extent in directions transverse to the respective panel wall reinforced thereby, for bracing said panel walls against local stresses, said profiled members intersecting and crossing each other.

2. A self-supporting, frameless body for motor vehicles according to claim 1 and in which some of said reinforcing members extend longitudinally in the direction of travel of the vehicle and others extend transversely thereto, the transversely extending members being formed by shaped sections of the panel walls themselves, while the longitudinally extending members are separately formed and mounted on the wall panels on the inner sides thereof.

FRIEDRICH EUGEN MAIER.